(12) United States Patent
Zhang

(10) Patent No.: US 11,594,030 B2
(45) Date of Patent: Feb. 28, 2023

(54) SYSTEMS AND METHODS FOR MONITORING TRAFFIC SIGN VIOLATION

(71) Applicant: SHANGHAI TRUTHVISION INFORMATION TECHNOLOGY CO., LTD., Shanghai (CN)

(72) Inventor: Zhong Zhang, Great Falls, VA (US)

(73) Assignee: SHANGHAI TRUTHVISION INFORMATION TECHNOLOGY CO., LTD., Shanghai (CN)

( * ) Notice: Subject to any disclaimer, the term of this patent is extended or adjusted under 35 U.S.C. 154(b) by 38 days.

(21) Appl. No.: 17/080,876

(22) Filed: Oct. 27, 2020

(65) Prior Publication Data

US 2021/0042531 A1 Feb. 11, 2021

Related U.S. Application Data

(63) Continuation of application No. PCT/CN2019/084432, filed on Apr. 26, 2019.
(Continued)

(51) Int. Cl.
*G06V 20/40* (2022.01)
*G06T 7/70* (2017.01)
(Continued)

(52) U.S. Cl.
CPC ............. *G06V 20/46* (2022.01); *G06T 7/70* (2017.01); *G06V 20/582* (2022.01);
(Continued)

(58) Field of Classification Search
CPC .. G06V 20/46; G06V 20/582; G06V 2201/07; G06T 7/70; G06T 2207/10016;
(Continued)

(56) References Cited

U.S. PATENT DOCUMENTS 7,262,790 B2   8/2007 Bakewell
9,495,601 B2 * 11/2016 Hansen .................. G06V 20/56
(Continued)

FOREIGN PATENT DOCUMENTS

CN    201149729 Y    11/2006
CN    102129728 A    7/2011
(Continued)

OTHER PUBLICATIONS

U.S. Appl. No. 62/625,351 (Year: 2018).*
(Continued)

*Primary Examiner* — Molly Wilburn
(74) *Attorney, Agent, or Firm* — Metis IP LLC

(57) ABSTRACT

A system and method for determining a traffic sign violation are provided. The method may include obtaining a traffic rule corresponding to the traffic sign. The method may further include acquiring, by at least one camera, video data associated with a scene around a traffic sign. The video data may include a series of frames. The method may further include identifying the vehicle in the series of frames and determining whether the vehicle violates the traffic rule based on the series of frames. In response to the determination that the vehicle violates the traffic rule, the method may further include obtaining information of the vehicle and transmitting the information of the vehicle to a server.

18 Claims, 11 Drawing Sheets

Related U.S. Application Data

(60) Provisional application No. 62/664,073, filed on Apr. 27, 2018.

(51) Int. Cl.
  *G08G 1/017* (2006.01)
  *G08G 1/0962* (2006.01)
  *G06V 20/58* (2022.01)

(52) U.S. Cl.
  CPC ....... *G08G 1/0175* (2013.01); *G08G 1/09623* (2013.01); *G06T 2207/10016* (2013.01); *G06T 2207/30252* (2013.01); *G06V 2201/07* (2022.01)

(58) Field of Classification Search
  CPC ........ G06T 2207/30252; G08G 1/0175; G08G 1/09623
  See application file for complete search history.

(56) References Cited

U.S. PATENT DOCUMENTS

| | | | |
|---|---|---|---|
| 2005/0151671 A1 | 7/2005 | Bortolotto | |
| 2005/0231387 A1 | 10/2005 | Markelz | |
| 2007/0290886 A1 | 12/2007 | Stam et al. | |
| 2008/0157945 A1* | 7/2008 | Bowler | B60Q 1/0023 348/148 |
| 2015/0161464 A1* | 6/2015 | Hansen | G06V 20/56 382/105 |
| 2016/0155332 A1* | 6/2016 | Wang | G08G 1/096716 340/932.2 |
| 2018/0211117 A1* | 7/2018 | Ratti | G06N 20/00 |
| 2018/0240336 A1* | 8/2018 | Kareev | G08G 1/04 |
| 2019/0205911 A1* | 7/2019 | Wang | G06Q 30/0217 |
| 2019/0243371 A1* | 8/2019 | Nister | G05D 1/0891 |
| 2020/0317218 A1* | 10/2020 | Mao | B60K 31/18 |

FOREIGN PATENT DOCUMENTS

| | | |
|---|---|---|
| CN | 102201165 A | 9/2011 |
| CN | 102254429 A | 11/2011 |
| CN | 105575127 A | 5/2016 |
| CN | 105654734 A | 6/2016 |
| CN | 106485927 A | 3/2017 |
| CN | 106683400 A | 5/2017 |
| CN | 106886755 A | 6/2017 |
| GB | 2531975 A | 5/2016 |
| JP | 2009237733 A | 10/2009 |
| JP | 2012181875 A | 9/2012 |

OTHER PUBLICATIONS

International Search Report in PCT/CN2019/084432 dated Aug. 2, 2019, 4 pages.

Written Opinion in PCT/CN2019/084432 dated Aug. 2, 2019, 3 pages.

First Office Action in Chinese Application No. 201980024019.0 dated Feb. 7, 2022, 24 pages.

* cited by examiner

1000

| Time Point | $t_1$ | $t_2$ | $t_3$ | $t_4$ | $t_5$ | $t_6$ | $t_7$ | $t_8$ | $t_9$ |
|---|---|---|---|---|---|---|---|---|---|
| Location change (cm) | / | 2 | 1 | 0 | 0 | 0 | 0 | 1 | 2 |

| Record Number | Violation Type | Plate Number | Time | Location |
|---|---|---|---|---|
| 18000001 | Stop sign violation | 1ABC234 | 2018/01/01/ 17:00 | XXX, California |
| 18000002 | No parking sign violation | 2DEF567 | 2018/01/02/ 17:50 | YYY, California |
| 18000003 | Speed limit sign violation | 3GHI890 | 2018/01/03/ 18:25 | ZZZ, California |

FIG. 11

SYSTEMS AND METHODS FOR MONITORING TRAFFIC SIGN VIOLATION

CROSS-REFERENCE TO RELATED APPLICATIONS

This application is a continuation of International Application No. PCT/CN2019/084432, filed on Apr. 26, 2019, which claims priority of U.S. Provisional Application No. 62/664,073, filed on Apr. 27, 2018, the entire contents of each of which are hereby incorporated by reference.

TECHNICAL FIELD

The present disclosure generally relates to traffic monitoring around a traffic sign, and more particularly, relates to systems and methods for monitoring a traffic sign violation around a traffic sign.

BACKGROUND

A traffic sign is a sign standing at the side of or above roads to give instructions or provide information to road users, such as drivers, cyclists, pedestrians, etc. Usually, every traffic sign is associated with a specific traffic rule that a vehicle, a motorcycle, or a pedestrian should comply with. For example, a stop sign is associated with a rule that requires any vehicle or motorcycle to be fully stopped for a certain time period (e.g., 3 s) before proceeding. However, the number of traffic signs in an area is too huge comparing with limited police resources (e.g., traffic polices) or traffic monitoring facilities, which makes it impossible to monitor violations around certain traffic signs such as stop signs in the community streets, near a school or a hospital, etc. Therefore, it is desirable to provide systems and methods for automatically monitoring traffic around a traffic sign and detecting traffic sign violations.

SUMMARY

The present disclosure relates to monitoring a traffic sign violation around a traffic sign. According to an aspect of the present disclosure, a system for determining a traffic sign violation is provided. The system may include at least one camera configured to acquire video data associated with a scene around a traffic sign. The video data may include a series of frames. The system may further include at least one storage medium storing a set of instructions and at least one processor configured to communicate with the at least one storage medium. When executing the set of instructions, the at least one processor may be directed to cause the system to obtain a traffic rule corresponding to the traffic sign and identify a vehicle in the series of frames. The at least one processor may be further directed to cause the system to determine whether the vehicle violates the traffic rule based on the series of frames. In response to the determination that the vehicle violates the traffic rule, the at least one processor may be further directed to cause the system to obtain information of the vehicle and transmit the information of the vehicle to a server.

In some embodiments, to identify the vehicle in the series of frames, the at least one processor may be further directed to cause the system to remove uninterested regions in the series of frames.

In some embodiments, to identify the vehicle in the series of frames, the at least one processor may be further directed to cause the system to obtain an object identification model and execute the object identification model to identify the vehicle in each of the series of frames. The at least one processor may be further directed to cause the system to correlate the identified vehicle in each of the series of frames.

In some embodiments, the object identification model may be a you only look once model, a Haar-boosting model, a Faster R-CNN model, or a Mask R-CNN model.

In some embodiments, the traffic sign may be a stop sign associated rule including a stop time threshold. To determine whether the vehicle violates the traffic rule, the at least one processor may be further directed to cause the system to compare, based on the series of frames, locations of the vehicle at the different time points. The at least one processor may be further directed to cause the system to determine a stop time of the vehicle based on the comparison between the locations of the vehicle at different time points and determine whether the stop time of the vehicle is less than the stop time threshold. In response to the determination that the stop time of the vehicle is less than the stop time threshold, the at least one processor may be further directed to cause the system to determine that the vehicle violates the stop sign associated rule.

In some embodiments, the stop time of the vehicle may be a time period when the velocity of the vehicle is zero.

In some embodiments, to determine the stop time of the vehicle based on the comparison between the locations of the vehicle at different time points, the at least one processor may be further directed to cause the system to determine a first time point when the locations of the vehicle start to be unchanged and determine a second time point when the locations of the vehicle start to change. The at least one processor may be further directed to cause the system to determine a difference between the first time point and the second time point as the stop time of the vehicle.

In some embodiments, to obtain the information of the vehicle, the at least one processor may be further directed to cause the system to identify a plate number of the vehicle.

In some embodiments, to identify the plate number of the vehicle, the at least one processor is further directed to cause the system to locate a plate region in at least one of the series of frames and identify the plate number in the plate region.

In some embodiments, in response to the determination that the vehicle violates the traffic rule, the at least one processor may be further directed to cause the system to: transmit a traffic violation notification to a user terminal that is associated with the vehicle violating the traffic rule.

In some embodiments, the information of the vehicle may include at least one of a plate number of the vehicle, a location where the vehicle violates the traffic rule, at least one of the series of frames or a time when the vehicle violates the traffic rule.

In some embodiments, the camera may be mounted on the traffic sign.

In some embodiments, the camera may be mounted on a vehicle near the traffic sign.

In some embodiments, the camera may be included in a mobile terminal.

According to another aspect of the present disclosure, a method for determining a traffic sign violation is provided. The method may include obtaining a traffic rule corresponding to the traffic sign. The method may further include acquiring, by at least one camera, video data associated with a scene around a traffic sign. The video data may include a series of frames. The method may further include identifying the vehicle in the series of frames and determining whether the vehicle violates the traffic rule based on the series of frames. In response to the determination that the vehicle violates the traffic rule, the method may further include obtaining information of the vehicle and transmitting the information of the vehicle to a server.

According to yet a further aspect of the present disclosure, a non-transitory computer readable medium is provided. The non-transitory computer readable medium may include executable instructions that, when executed by at least one processor, cause the at least one processor to effectuate a method for determining a traffic sign violation. The method may include obtaining a traffic rule corresponding to the traffic sign. The method may further include acquiring, by at least one camera, video data associated with a scene around a traffic sign. The video data may include a series of frames. The method may further include identifying a vehicle in the series of frames and determining whether the vehicle violates the traffic rule based on the series of frames. In response to the determination that the vehicle violates the traffic rule, the method may further include obtaining information of the vehicle and transmitting the information of the vehicle to a server.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 10 is a schematic diagram of location changes of a vehicle corresponding to different time points according to some embodiments of the present disclosure; and FIG. 11 is a schematic diagram of exemplary traffic sign violation records according to some embodiments of the present disclosure.

DETAILED DESCRIPTION

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
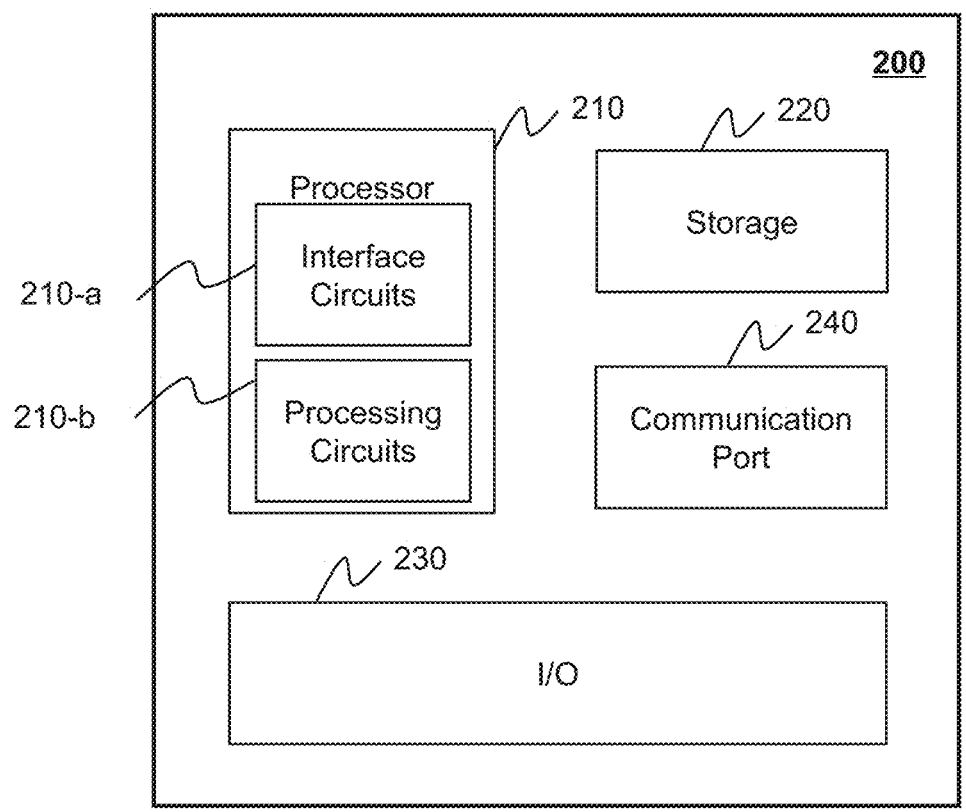
FIG. 2 is a schematic diagram illustrating exemplary hardware and/or software components of an exemplary computing device on which a processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The vehicle may include a horse, a carriage, a rickshaw (e.g., a wheelbarrow, a bike, a tricycle), an electromobile (e.g., an electric bike, an electric tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

A traffic sign used in the present disclosure may be a sign associated with a specific traffic rule. The traffic sign may stand above or at the side of a road. The traffic sign may include a stop sign, a yield sign, a no parking sign, a parking time restriction sign, a speed limit sign, a do not enter sign, a left turn only sign, a no left turn sign, a no right turn sign, a no U turn sign, or the like, or any combination thereof. For example, a stop sign in the present disclosure may refer to a red octagonal sign with a "STOP" written on it in white. The stop sign notifies the drivers to make sure no cars are coming and stop before proceeding. A no parking sign in the present disclosure may refer to a white rectangular sign with a "NO PARKING" written on it in red. The no parking sign notifies the drivers not to park near the no parking sign. A speed limit sign may be a white rectangular sign with a specific maximum speed limit and/or a specific minimum speed limit written in black. The speed limit sign notifies the drivers not to drive faster than the maximum speed limit and/or slower than the minimum speed limit. It should be noted that the traffic signs described herein are merely illustrations and shall not limit the scope of the present disclosure. For example, the stop sign (the no parking sign and/or the speed limit sign) may also refer to other signs of same or different sizes or shapes with same or similar functions. In some embodiments, the traffic signs described in the present disclosure may exist in a form of electronic screens. The contents displayed on the electronic screens (e.g., letters, numbers, graphs) may be fixed or adjustable. In some embodiments, the number shown on the electronic screen of a traffic sign may be changed. Merely by way of example, the maximum speed limit shown on a speed limit sign may be 60 miles per hour during the day, and may be changed to 50 miles per hour during the night. In some embodiments, the type of the traffic sign may also be changed. For example, a speed limit sign may be changed into a no parking sign by changing the letters, numbers, and/or shapes shown on the electronic screen.

The present disclosure relates to systems and methods for monitoring traffic sign violations. For example, a traffic rule corresponding to a traffic sign may be obtained. For instance, the traffic sign may include a stop sign, a parking restriction sign, a speed limit sign, etc. Video data including a series of frames associated with a scene around the traffic sign may be obtained by a camera. A vehicle in the series of frames may be identified based on, for example, an object identification model. It may be determined whether the vehicle violates the traffic rule based on the series of frames. In response to the determination that the vehicle violates the traffic rule, information of the vehicle may be obtained. Exemplary information of the vehicle may include a plate number of the vehicle, a location where the vehicle violates the traffic rule, at least one of the series of frames or a time when the vehicle violates the traffic rule, or the like, or any combination thereof. The information of the vehicle may be transmitted to a server.

Figure 1:
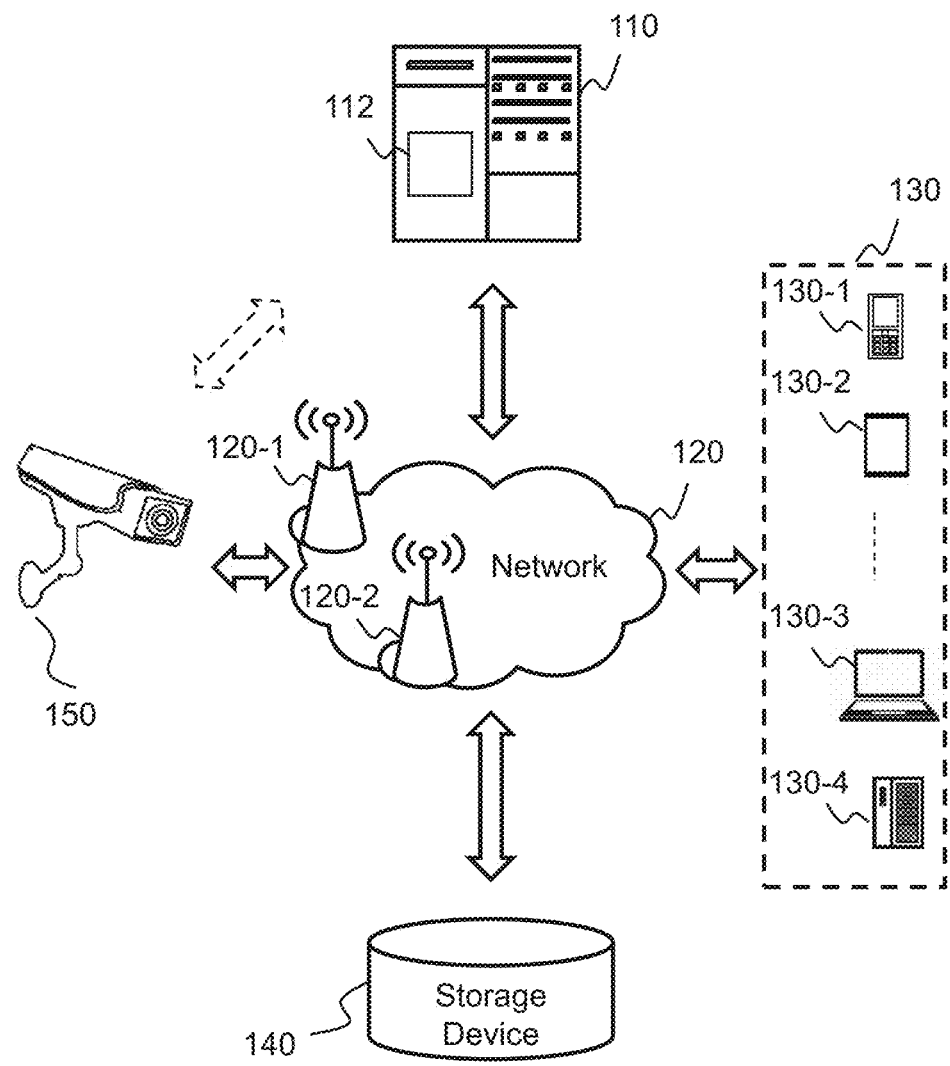
FIG. 1 is a schematic diagram illustrating an exemplary monitoring system according to some embodiments of the present disclosure.

FIG. 1 is a schematic diagram of an exemplary monitoring system 100 according to some embodiments of the present disclosure. In some embodiments, the monitoring system 100 may be configured to monitor the traffic around a traffic sign. The traffic sign may be configured around a school, in a residential area, in a park, etc. The monitoring system 100 may detect a vehicle violating a traffic rule associated with the traffic sign and record information related to the vehicle. The monitoring system 100 may include a server 110, a network 120, a user terminal 130, a storage device 140 and a camera 150. The server 110 may include a processing engine 112. In some embodiments, the server 110, the user terminal 130, the storage device 140 and the camera 150 may be connected to and/or communicate with each other via a wireless connection (e.g., the network 120), a wired connection, or a combination thereof.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the user terminal 130, and/or the storage device 140 via the network 120. As another example, the server 110 may be directly connected to the user terminal 130, and/or the storage device 140 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the traffic around a traffic sign. For example, the processing engine 112 may identify a vehicle in video data acquired by the camera 150 and determine whether the vehicle violates a traffic rule associated with the traffic sign. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the monitoring system 100 (e.g., the server 110, the user terminal 130, the storage device 140, and the camera 150) may send information and/or data to other component(s) in the monitoring system 100 via the network 120. For example, the processing engine 112 may send information of a vehicle that violates a traffic rule associated with a traffic sign to the user terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the monitoring system 100 may be connected to the network 120 to exchange data and/or information.

In some embodiments, the user terminal 130 may include a mobile device 130-1, a tablet computer 130-2, a laptop computer 130-3, or the like, or any combination thereof. In some embodiments, the mobile device 140-1 may include a smart home device, a wearable device, a mobile equipment, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile equipment may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a user terminal 130 used by a driver responsible for the violation of a traffic rule associated with a traffic sign may receive a notification sent from the processing engine 112. In some embodiments, a traffic management officer (e.g., a traffic police officer, a traffic controller) may use the user terminal 130 to access violation records stored in the storage device 140.

In some embodiments, the user terminal 130 may be a mobile terminal configured to include a camera. The user terminal 130 may send and/or receive information related to traffic sign violation monitoring to the processing engine 112 or a processor installed in the user terminal 130 via a user interface. For example, the user terminal 130 may send video data captured by the camera installed in the user terminal 130 to the processing engine 112 or the processor installed in the user terminal 120 via the user interface. The user interface may be in the form of an application for traffic sign violation monitoring implemented on the user terminal 130. The user interface implemented on the user terminal 130 may facilitate communication between a user and the processing engine 112. For example, the user may input and/or choose a traffic sign or a traffic rule via the user interface. The processing engine 112 may receive the inputted traffic sign or traffic rule via the user interface. As another example, a user may input a request for traffic sign violation monitoring via the user interface implemented on the user terminal 130. In some embodiments, in response to the request for traffic sign violation monitoring, the user terminal 130 may directly determine whether the vehicle violates the traffic sign via a processor of the user terminal 130 based on the video data captured by the camera installed in the user terminal 130 as described elsewhere in the present disclosure (e.g., FIGS. 5-7 and the descriptions thereof). In some embodiments, in response to the request for traffic sign violation monitoring, the user terminal 130 may send the request for traffic sign violation monitoring to the processing engine 112 for determining whether a vehicle violates a traffic sign based on video data captured by the camera 150 or a camera installed in the user terminal 130 as described elsewhere in the present disclosure (e.g., FIGS. 5-7 and the descriptions thereof). In some embodiments, the user interface may facilitate the presentation or display of information and/or data (e.g., a signal) relating to traffic sign violation monitoring received from the processing engine 112. For example, the information and/or data may include a result indicating whether the vehicle violates the traffic sign generated by the processing engine 112, or information of the vehicle if the vehicle violates the traffic sign, etc. In some embodiments, the information and/or data may be further configured to cause the user terminal 130 to display the result to the user.

The storage device 140 may store data and/or instructions. In some embodiments, the storage device 140 may store data obtained from the camera 150. The storage device 140 may store data and/or instructions that the processing engine 112 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 120 to communicate with one or more components in the monitoring system 100 (e.g., the server 110, the user terminal 130). One or more components in the monitoring system 100 may access the data or instructions stored in the storage device 140 via the network 120. In some embodiments, the storage device 140 may be directly connected to or communicate with one or more components in the monitoring system 100 (e.g., the server 110, the user terminal 130). In some embodiments, the storage device 140 may be part of the server 110.

The camera 150 may acquire video data. In some embodiments, the video data acquired may be associated with a scene around a traffic sign. Merely by way of example, the camera 150 may be a video camera, a security camera, a web camera, a smartphone camera, a tablet camera, a laptop camera, etc. The camera 150 may be mounted on the traffic sign, or an object around the traffic sign (e.g., a traffic light, a utility pole, a vehicle). In some embodiments, the camera 150 may be power supplied by a power unit (e.g., a power generator, an electric transmission line, a solar power supply unit). Additionally, the camera 150 may use a battery bank for extended power. In some embodiments, the camera 150 may be configured with/coupled to a network module that enables the camera 150 to be connected with the processing engine 112, the user terminal 130, and/or the storage device 140 via the network 120.

It should be noted that the above description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the camera 150 may be configured with a storage module, a processing module a communication module, etc. However, those variations and modifications do not depart the scope of the present disclosure.

FIG. 2 is a schematic diagram illustrating exemplary hardware and/or software components of an exemplary computing device 200 on which the processing engine 112 may be implemented according to some embodiments of the present disclosure. As illustrated in FIG. 2, the computing device 200 may include a processor 210, a storage 220, an input/output (I/O) 230, and a communication port 240.

The processor 210 (e.g., logic circuits) may execute computer instructions (e.g., program code) and perform functions of the processing engine 112 in accordance with techniques described herein. In some embodiments, the processor 210 may be configured to process data and/or information related to one or more components of the monitoring system 100. For example, the processor 210 may identify a vehicle in the video data acquired by the camera 150. As another example, the processor 210 may determine whether the identified vehicle violates a traffic rule associated with a traffic sign based on the series of images. The processor 210 may also be configured to identify information of the vehicle that violates the traffic rule associated with the traffic sign. The processor 210 may further send the information of the vehicle that violates the traffic rule to the server 110. In some embodiments, the processor 210 may send a notification to a user terminal 130 associated with the vehicle that violates the traffic rule.

In some embodiments, the processor 210 may include interface circuits 210-a and processing circuits 210-b therein. The interface circuits may be configured to receive electronic signals from a bus (not shown in FIG. 2), wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. For example, the processor 210 may process information associated with a vehicle obtained from the user terminal 130, the storage device 140, and/or any other component of the monitoring system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the user terminal 130, the storage device 140, and/or any other component of the monitoring system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 112 for determining a vehicle value.

The I/O 230 may input and/or output signals, data, information, etc. In some embodiments, the I/O 230 may enable a user interaction with the processing engine 112. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 112 and the user terminal 130, the camera 150, or the storage device 140. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 240 may be and/or include a standardized communication port, such as RS232, RS485, etc.

Figure 3:
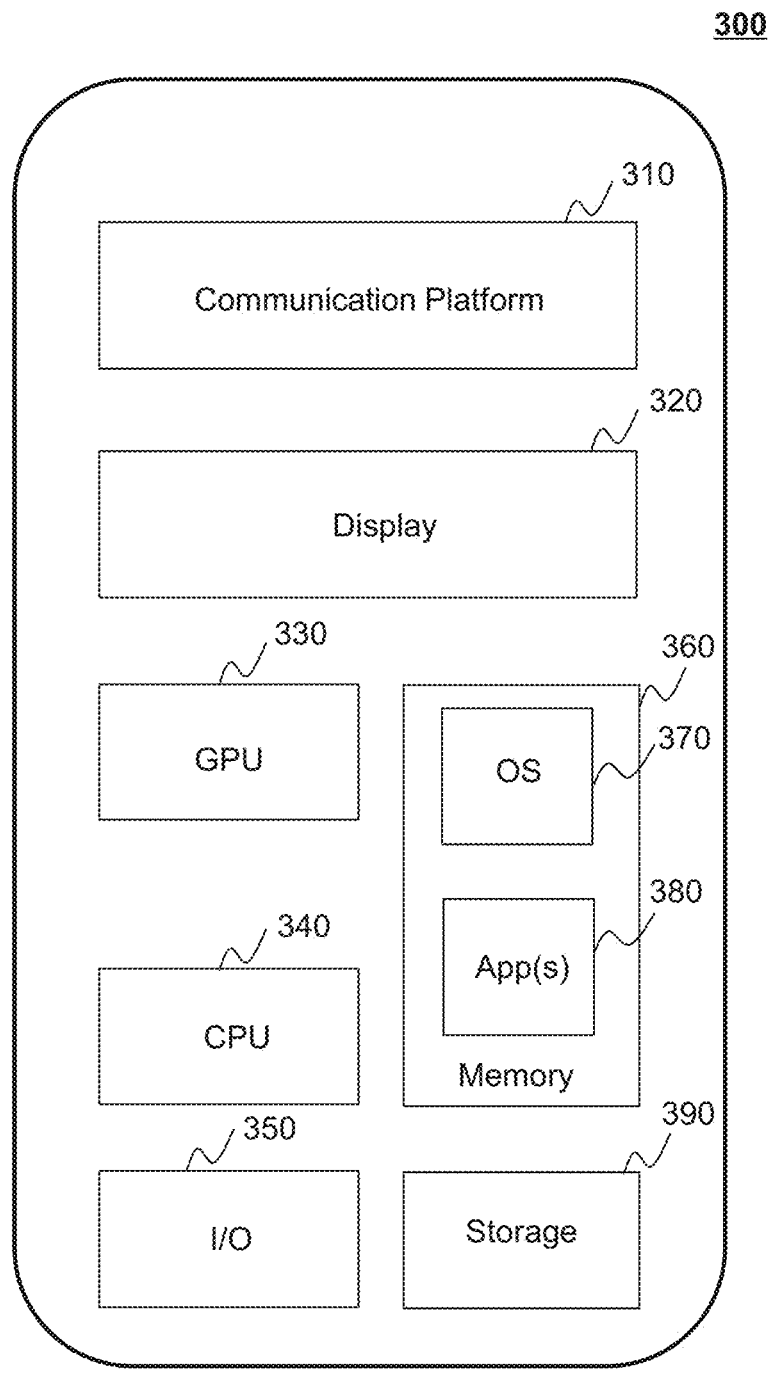
FIG. 3 is a schematic diagram illustrating exemplary hardware and/or software components of an exemplary mobile device on which one or more terminals may be implemented according to some embodiments of the present disclosure.

FIG. 3 is a schematic diagram illustrating exemplary hardware and/or software components of an exemplary mobile device on which the user terminal 130 may be implemented according to some embodiments of the present disclosure. In some embodiments, the mobile device 300 shown in FIG. 3 may be used by a user. The user may be a driver, a passenger, a traffic police, a traffic controller, or the like. For example, the traffic police or the traffic controller may review a violation record via the mobile device 300. In some embodiments, the traffic police officer or the traffic controller may make a penalty decision based on the violation record and a traffic rule associated with the violation record. The penalty decision may be input to the mobile device 300. As another example, a driver responsible for the violation of the traffic rule may receive a notification via the mobile device 300 and may pay the fine online via the mobile device 300.

As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 112 and/or other components of the monitoring system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the monitoring system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 sends out data (e.g., a current estimated value of a target vehicle) to the user terminal 130, a processor of the processing engine 112 may generate electrical signals encoding the data. The processor of the processing engine 112 may then send the electrical signals to an output port. If the user terminal 130 communicates with the processing engine 112 via a wired network, the output port may be physically connected to a cable, which may further transmit the electrical signals to an input port of the server 110. If the user terminal 130 communicates with the processing engine 112 via a wireless network, the output port of the processing engine 112 may be one or more antennas, which may convert the electrical signals to electromagnetic signals. Within an electronic device, such as the user terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage device 140), it may send out electrical signals to a read/write device of the storage medium, which may read or write structured data in the storage medium. The structured data may be transmitted to the processor in the form of electrical signals via a bus of the electronic device. Here, an electrical signal may refer to an electrical signal, a series of electrical signals, and/or a plurality of discrete electrical signals.

Figure 4:
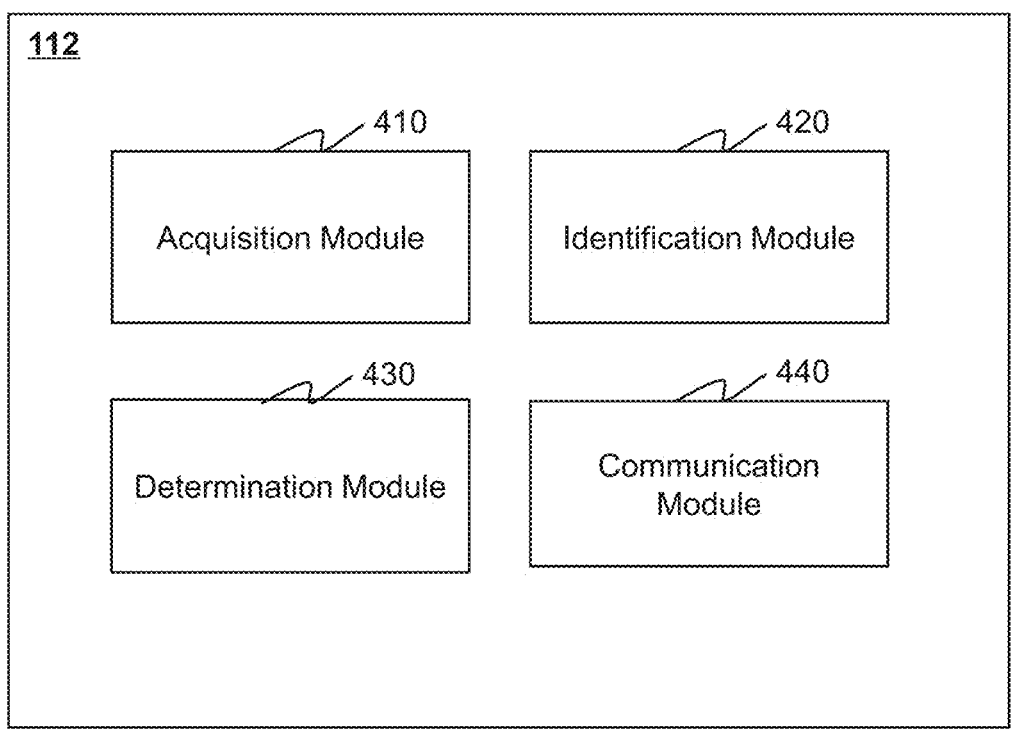
FIG. 4 is a schematic block diagram illustrating an exemplary processing engine according to some embodiments of the present disclosure.

FIG. 4 is a schematic block diagram illustrating an exemplary processing engine according to some embodiments of the present disclosure. In some embodiments, the processing engine 112 may include an acquisition module 410, an identification module 420, a determination module 430 and a communication module 440. The processing engine 140 may be implemented on various components (e.g., the processor 210 of the computing device 200 as illustrated in FIG. 2). For example, at least a portion of the processing engine 140 may be implemented on a computing device as illustrated in FIG. 2 or a mobile device as illustrated in FIG. 3.

The acquisition module 410 may acquire data and/or information related to the monitoring system 100. In some embodiments, the acquisition module 410 may acquire the data and/or information related to the monitoring system 100 from one or more components of the monitoring system 100, such as the camera 150, the storage device 140. For example, the acquisition module 410 may acquire video data from the camera 150. The video data may include a series of frames. The acquisition module 410 may transmit the series of frames to other modules (e.g., the identification module 420, the determination module 430) for further processing. As another example, the acquisition module 410 may acquire a traffic rule associated with a traffic sign from the storage device 140. As yet another example, the acquisition module 410 may acquire an object identification model from the storage device 140.

The identification module 420 may identify one or more objects from the data and/or information related to the monitoring system 100. In some embodiments, the identification module 420 may identify a vehicle in the series of frames acquired from the acquisition module 410. There may be one or more objects in the series of frames. The identification module 420 may identify each object in each of the series of frames and correlate the identified objects. For instance, one or more vehicles in the series of frames may be identified using an object identification model. As another example, the static objects such as a building, a mailbox, etc. may be identified from the series of frames. In some embodiments, the identification module 420 may identify information of a vehicle (e.g., a driver license id, a plate number) that violates a traffic rule based on the series of frames. The traffic rule may be associated with a traffic sign.

The determination module 430 may determine whether a vehicle violates a traffic rule associated with a traffic sign. The determination module 430 may perform an analysis on the motion of the vehicle based on the series of frames. For instance, the determination module 430 may obtain information related to the motion of the vehicle by comparing the locations of the vehicle in the series of frames. Exemplary information related to the motion of the vehicle may include a stop time of the vehicle, an estimated speed of the vehicle, a moving trace of the vehicle, or the like, or any combination thereof.

The communication module 440 may receive or send information or instructions to one or more components of the monitoring system 100. In some embodiments, the communication module 440 may receive an instruction of a user from the user terminal 130. For example, the instruction may direct the acquisition module 410 to acquire a traffic rule associated with a traffic sign. As another example, the instruction may direct the camera 150 to adjust the number of frames captured per second (also referred to as frame rate). In some embodiments, the communication module 440 may send information of a vehicle that violates the traffic rule associated with a traffic sign to a server. Exemplary information of the vehicle may include a plate number of the vehicle, a location where the vehicle violates the traffic rule, at least one of the series of frames or a time when the vehicle violates the traffic rule, or the like, or any combination thereof. In some embodiments, the communication module 440 may send a notification to a user terminal 130 that is associated with the vehicle that violates the traffic rule.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the identification module 410 may be integrated in the vehicle identification module 420 as a single module which may both identify a mobile terminal and a target vehicle associated with the mobile terminal.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may further include a storage module (not shown in FIG. 4). The storage module may be configured to store data generated during any process performed by any component of the processing engine 112. As another example, each of the components of the processing engine 112 may correspond to a storage module, respectively. Additionally or alternatively, the components of the processing engine 112 may share a common storage module inside one of the components.

Figure 5:
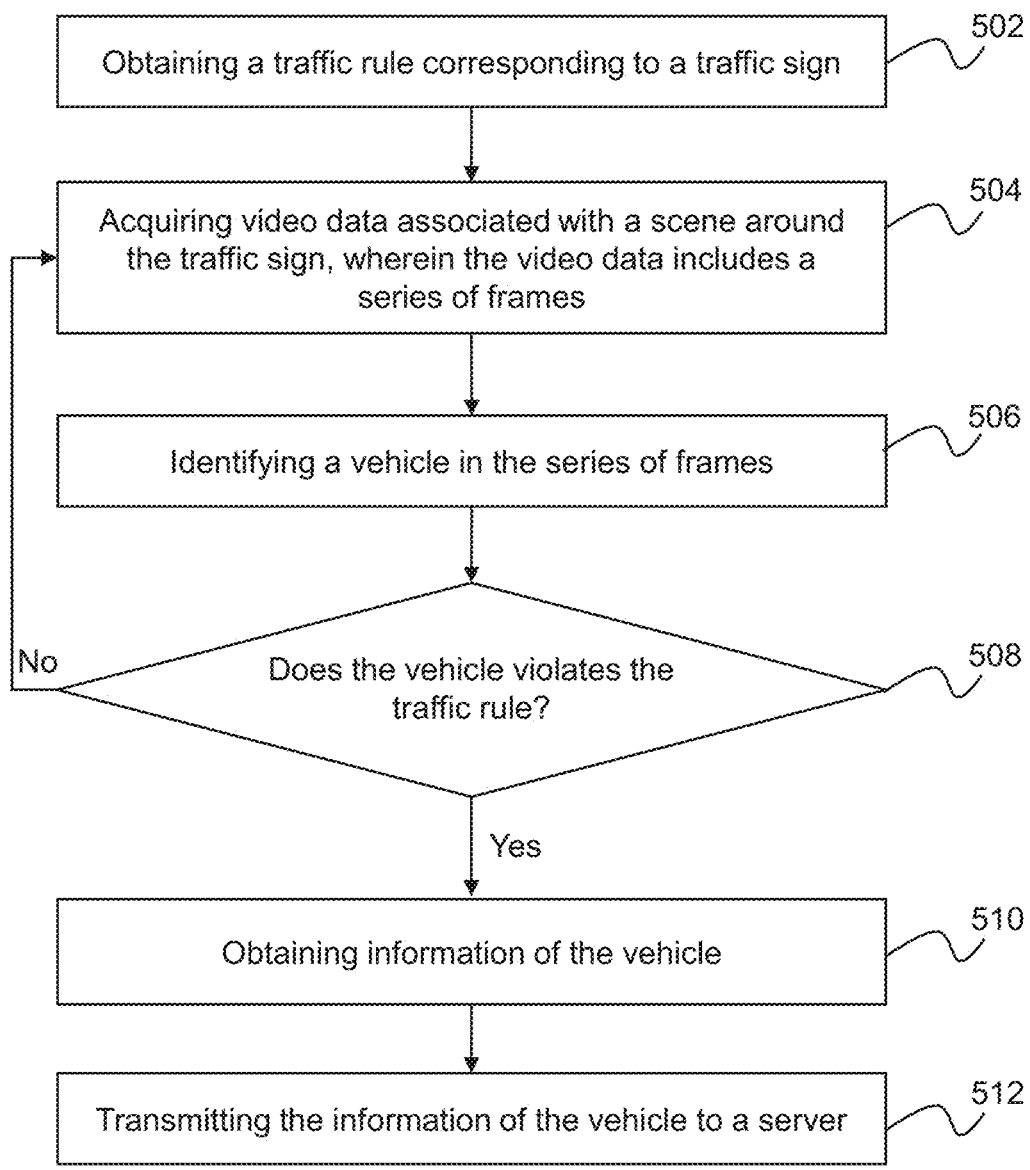
FIG. 5 is a flowchart illustrating an exemplary process for monitoring traffic sign violation according to some embodiments of the present disclosure.

FIG. 5 is a flowchart illustrating an exemplary process for monitoring traffic sign violation according to some embodiments of the present disclosure. In some embodiments, the process 500 shown in FIG. 5 may be implemented in the monitoring system 100 illustrated in FIG. 1. For example, the process 500 may be stored in a storage medium (e.g., the storage device 140, or the storage 220 of the computing device 200) as a form of instructions, and invoked and/or executed by a processor (e.g., the processing engine 112 of the server 110, the processor 220 of the computing device 200, or one or more modules in the processing engine 112 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the processing engine 112 may obtain a traffic rule corresponding to a traffic sign. An exemplary traffic sign may include a stop sign, a no parking sign, a parking time restriction sign, a speed limit sign, a yield sign, a do not enter sign, a left turn only sign, a no left turn sign, a no right turn sign, a no U turn sign, or the like, or any combination thereof. The traffic rule corresponding to the traffic sign may be associated with a specific requirement that a vehicle should obey at or near the traffic sign. For instance, the traffic rule corresponding to a stop sign may include requiring the vehicle to be fully stopped at the stop sign for at least a period of time, such as 3 seconds. The traffic rule corresponding to a no parking sign may include prohibiting any vehicle from parking near the no parking sign. The traffic rule corresponding to a parking time restriction sign may include prohibiting any vehicle from parking near the parking time restriction sign for more than a preset time length or outside a preset time period. The preset time length may be, for example, 15 minutes, 30 minutes, an hour, two hours, etc. The preset time period may be, for example, from 10:00 a.m. to 4:00 p.m., from 7:00 p.m. to 10:00 p.m., etc. In some embodiments, the preset time length and the preset time period may vary in different regions. In some embodiments, the preset time length and the preset time period may be shown on the parking time restriction sign. The traffic rule corresponding to a speed limit sign may include prohibiting any vehicle from driving faster than a maximum speed limit and/or slower than a minimum speed limit. For example, a maximum speed limit near a school or a residential area may be 25 miles per hour. As another example, a minimum speed limit for a highway may be 40 miles per hour. In some embodiment, the maximum speed limit and the minimum speed limit may be shown on the speed limit sign.

In some embodiments, a plurality of traffic rules may be stored in the storage device 140. The processing engine 112 may obtain a traffic rule corresponding to a traffic sign from the storage device 140 via the network 120. For instance, the monitoring system 100 may be implemented on or near a traffic sign. A user (e.g., a traffic police officer) may input an instruction including the type of traffic sign to the monitoring system 100. The processing engine 112 may select the traffic rule corresponding to the traffic sign from the plurality of traffic rules. In some embodiments, the monitoring system 100 may automatically recognize the type of traffic sign on which it is implemented.

In 504, the camera 150 may acquire video data associated with a scene around the traffic sign. The video data may include a series of frames. The frame rate of the video data (also referred to as the number of frames captured per second) may be, for example, 20, 25, 40, etc. Each of the series of frames may include one or more objects in the scene around the traffic sign. For instance, the objects may include vehicles, pedestrians, pets, traffic lights, traffic signs, street lamps, utility poles, trees, buildings, or the like, or any combination thereof. The processing engine 112 may perform an analysis on the motion of the objects around the traffic sign based on the series of frames.

In some embodiments, the series of frames may be acquired by the camera 150 as described in FIG. 1. In some embodiments, the series of frames may be acquired by more than one camera 150. For example, a first camera 150-1 (not shown in the figure) may be configured to acquire a low-resolution video (or low-resolution frame of images) for the analysis on the motion of the objects. A second camera 150-2 (not shown in the figure) may be configured to acquire one or more high-resolution images for identifying information of the objects, for example, a plate number of a vehicle.

In some embodiments, the camera 150 may be detachably mounted on the traffic sign or an object near the traffic sign. For example, the object may include a traffic light, a street lamp, a utility pole, a tree, a building, or the like, or any combination thereof. When the traffic near the traffic sign does not need to be monitored any more, the camera 150 may be demounted from the traffic sign or the object near the traffic sign. The camera 150 may then be mounted on another traffic sign or an object near another traffic sign to acquire video data associated with a scene near the another traffic sign. In some embodiments, the camera 150 may be mounted on a vehicle parked near a traffic sign. As used herein, "to be mounted on a vehicle" refers to be mounted on an external part of the vehicle (e.g., on the roof, on the front window, on the rearview mirror) or to be mounted on an internal part of the vehicle (e.g., above the panel, on the front window from inside of the vehicle, or on a passenger seat). When another traffic sign is planned to be monitored, the vehicle may be driven and parked near another traffic sign and the camera mounted on the vehicle may monitor traffic information around the another traffic sign.

In 506, the processing engine 112 may identify a vehicle in the series of frames. The processing engine 112 may obtain the series of frames captured by the camera 150 via the network 120. In some embodiments, the frames may include an uninterested region in the video scene. For example, the uninterested region may include a lane where the motion of the vehicle is not limited by the traffic sign. As another example, the uninterested region may include a static object, such as a tree, a building, a vehicle parked by the road, or the like, or any combination thereof. In some embodiments, the processing engine 112 may remove the uninterested region in the series of frames before identifying the vehicle in the series of frames.

In some embodiments, the processing engine 112 may identify the vehicle using an object identification model. The identification model may be obtained from the storage device 140. The processing engine 112 may execute the object identification model to identify the vehicle in each of the series of frames. The identified vehicle in each of the series of frames may be correlated and the motion of the identified vehicle may be analyzed based on the correlated series of frames. Details regarding the identification of the vehicle may be found in the descriptions associated with FIG. 6.

In 508, the processing engine 112 may determine whether the vehicle violates the traffic rule. In some embodiments, the processing engine 112 may determine whether the vehicle violates the traffic rule by analyzing information related to the motion of the vehicle. The information related to the motion of the vehicle may be obtained based on an analysis of the series of frames. For example, the information may include whether the vehicle stops near the traffic sign, a stop time of the vehicle, an estimated speed, a moving trace of the vehicle, or the like, or any combination thereof. As used herein, a "stop time" refers to a time period when the velocity of the vehicle is zero. Merely by way of example, the monitoring system 100 may be associated with a stop sign and the processing engine 112 may determine whether a vehicle violates the traffic rule corresponding to the stop sign (i.e., the stop sign associated rule) based on the stop time of the vehicle. If the stop time of the vehicle is greater than or equal to a threshold as required by the stop sign associated rule, the processing engine 112 may determine that the vehicle does not violate the stop sign associated rule. If the stop time of the vehicle is less than the threshold, the processing engine 112 may determine that the vehicle violates the traffic rule.

In response to a determination that the vehicle does not violate the traffic rule, the process 500 may proceed to step 504 to acquire another series of frames associated with the scene around the traffic sign. In response to a determination that the vehicle violates the traffic rule, the process 500 may proceed to step 510.

In 510, the processing engine 112 may obtain information of the vehicle. Exemplary information of the vehicle may include a plate number of the vehicle, a location where the vehicle violates the traffic rule, at least one of the series of frames that includes the vehicle violating the traffic rule, a time when the vehicle violates the traffic rule, or the like, or any combination thereof. The plate number of the vehicle may be used to identify a driver responsible for the violation of the traffic rule. Other methods for identifying the driver responsible for the violation may also be used, which are not limited by the present disclosure. For example, the driver may be identified based on a facial recognition technique.

In some embodiments, the identification of the plate number of the vehicle may include locating a plate region in at least one of the series of frames. The plate region may include features that may be used to distinguish the plate region from other portions of the vehicle. For example, the color of the plate region may be different from the color of the other portions of the vehicle. As another example, the plate region may have a characteristic size and shape. In some embodiments, the plate region may be located by a plate region locating algorithm. For instance, the plate region locating algorithm may include an algorithm based on an edge feature (e.g., the straight boundaries or rectangular corners of the plate region), an algorithm based on a color feature, etc. In some embodiments, the plate region may also be located using a machine-learning technique, such as an Adaboosting algorithm. In some embodiments, the processing engine 112 may identify the plate number in the plate region. For example, the plate number may be identified based on a plate number identification model, such as a neural network model.

In some embodiments, the vehicle may be associated with an electronic license plate. As used herein, an "electronic license plate" refers to a device that can emit a wireless signal associated with the plate number of the vehicle and/or other information related to identification of the vehicle. In some embodiments, the electronic license plate may be implemented on a built-in component of the vehicle, such as a communication component of the vehicle. Alternatively, the electronic license plate may be an additional component mounted on the vehicle. For example, the electronic license plate may be a radio-frequency identity card. It should be noted that other devices with the same or similar functions may also be treated as electronic license plates. In some embodiments, a communication module (e.g., the communication module 440 of the processor 112) may send a request to an electronic license plate of a vehicle that violates a traffic rule corresponding to a traffic sign. The electronic license plate may receive the request and transmit information related to the identification of the vehicle (e.g., a plate number) that violates the traffic rule to the communication module 440.

In 512, the processing engine 112 may transmit the information of the vehicle to the server 110. In some embodiments, the information of the vehicle may be integrated into a violation record as illustrated in FIG. 11. The violation record may be transmitted to the server 110. For example, the violation record transmitted to the server 110 may include a record number, a violation type, a plate number of the vehicle that violates the traffic rule, the time when the vehicle violates the traffic rule, the location where the vehicle violates the traffic rule, or the like, or any combination thereof. The violation type may be associated with the type of the traffic sign that the vehicle violates. The time when the vehicle violates the traffic rule may include a date and/or a time point during a day when the violation occurs.

In some embodiments, the violation record may be transmitted to a user terminal (e.g., the user terminal 130). A user (e.g., a police officer, a traffic controller) may review the violation record via a user interface of the user terminal 130.

In some embodiments, the user may search for a violation record by inputting a record number, a plate number, a name of a driver, an identity number of a driver, or the like, or any combination thereof. In some embodiments, the user may perform a statistic analysis on the violation records. For example, the user may determine a total number of the violation records in an area, and/or changes in the total number of the violation records in the area during a time period. As another example, the user may determine a type of violation that occurs most in the area and increase the monitoring of the type of violation in the area. In some embodiment, the user may add a violation record, for example, in the table shown in FIG. 11. The user may also delete a violation record. In some embodiments, the user may determine, based on the violation record, a penalty decision for the driver responsible for the violation according to the associated traffic rule.

In some embodiments, the process 500 may further include sending a notification to a user terminal (e.g., the user terminal 130) associated with the vehicle that violates the traffic rule. The user terminal 130 may be used by the driver responsible for the violation of the traffic rule of the vehicle. For example, the notification may include a violation type, a time when the vehicle violates the traffic rule, a place when the vehicle violates the traffic rule, a penalty decision, a deadline before which the driver should deal with the penalty, or the like, or any combination thereof. The notification may be sent to the driver as a text message, an email, a message of an application associated with a traffic violation notification service, or the like, or any combination thereof. In some embodiments, the penalty may include a fine. The driver may pay the fine online or by other means. In some embodiments, the penalty may include a license suspension, which prohibits the driver from driving any vehicle or a certain type of vehicle for a period of time or permanently.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, instead of video data, the camera 150 may capture a plurality of images at pre-determined time intervals in 504. The pre-determined time interval may be 0.1 s, 0.5 s, 1 s, 1.5 s, etc.

Figure 6:
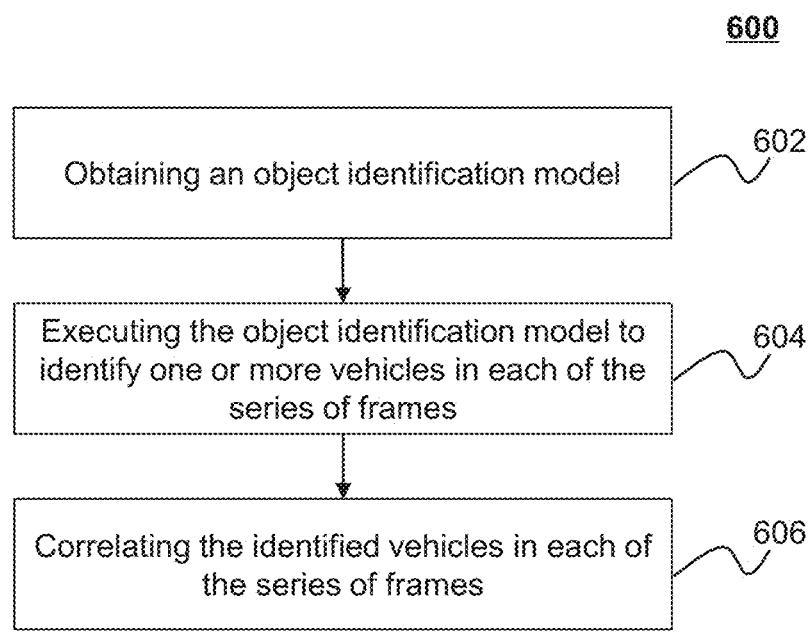
FIG. 6 is a flowchart illustrating an exemplary process for identifying a vehicle in a series of frames according to some embodiments of the present disclosure.

FIG. 6 is a flowchart illustrating an exemplary process for identifying a vehicle in a series of frames according to some embodiments of the present disclosure. In some embodiments, the process 600 may be implemented in the monitoring system 100 illustrated in FIG. 1. For example, the process 600 may be stored in a storage medium (e.g., the storage device 140, or the storage 220 of the computing device 200) as a form of instructions, and invoked and/or executed by a processor (e.g., the processing engine 112 of the server 110, the processor 220 of the computing device 200, or one or more modules in the processing engine 112 illustrated in FIG. 4). The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 602, the processing engine 112 may obtain an object identification model. In some embodiments, the object identification model may include a trained machine learning model. For example, the trained machine learning model may include a you only look once (YOLO) model, a Haar-boosting model, a Faster R-CNN model, a Mask R-CNN model, or the like, or any combination thereof. In some embodiments, the processing engine 112 may directly obtain the object identification model from the storage device 140 via the network 120. In some embodiments, the processing engine 112 may obtain a machine learning model and train the machine learning model. For instance, the machine learning model may be trained using a group of sample images and a group of object identification results (e.g., positive or negative labels, labels of type of objects) corresponding to the group of sample images. The trained machine learning model may be used as the object identification model for identifying the vehicle in each of the series of frames.

In 604, the processing engine 112 may execute the object identification model to identify one or more vehicles in each of the series of frames. In some embodiments, each of the series of frames may include a plurality of objects, for example, vehicles, pedestrians, pets, traffic lights, traffic signs, street lamps, utility poles, trees, buildings, or the like, or any combination thereof. In some embodiments, the processing engine 112 may remove an uninterested region in the series of frames before executing the object identification model. Such process of removing the uninterested region may save the processing time for the identification of the vehicle. The uninterested region may include objects that remain static for a certain period of time, such as traffic lights, traffic signs, street lamps, utility poles, trees, buildings, or the like, or any combination thereof. The uninterested region may also include a lane on which the motion of the vehicle is not limited by the traffic rule.

In some embodiments, the processing engine 112 may execute the object identification model to identify any vehicle among the plurality of objects in each of the series of frames. If no vehicle is identified in the series of frames, the processing engine 112 may not conduct further processing on the series of frames. If one or more vehicles are identified in the series of frames, the process 600 may proceed to operation 606.

In 606, the processing engine 112 may correlate the identified vehicles in each of the series of frames. In some embodiments, the identified vehicles may be correlated using an object tracking algorithm. For instance, the object tracking algorithm may include a Mean-Shift tracking algorithm, a Continuously Adaptive Mean-Shift (CamShift) algorithm, a Learning Multi-domain Convolutional Neural Network (MDNet) algorithm, a Hierarchical Convolutional Features (HCF) algorithm, or the like, or any combination thereof. Merely by way of example, the processing engine 112 may identify a first object as a first vehicle in a first frame of the series of frames and a second object as a second vehicle in a second frame of the series of frames. In some embodiments, the processing engine 112 may determine a similarity degree between the first vehicle and the second vehicle. If the similarity degree is lower than a preset threshold, then the first vehicle and the second vehicle may be designated as different vehicles. If the similarity is higher than or equal to the preset threshold, then the first vehicle and the second vehicle may be designated as the same vehicle (i.e., correlated). Similarly, other objects in the series of frames may be identified and correlated. The processing engine 112 may further determine whether the one or more identified vehicles violate the traffic rule corresponding to the traffic sign based on the series of frames (as described in operation 508).

Figure 7:
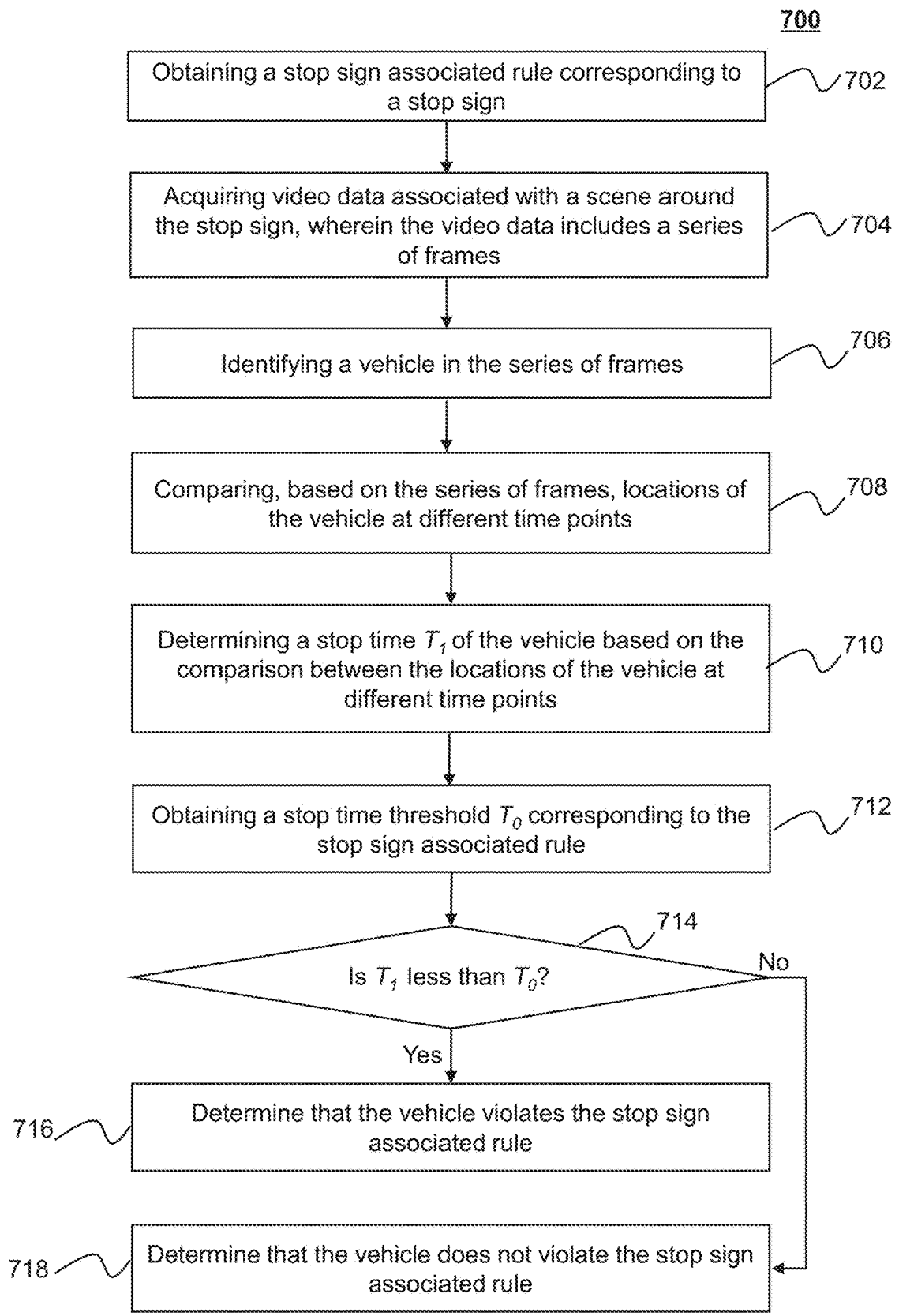
FIG. 7 is a flowchart illustrating an exemplary process for monitoring stop sign violation according to some embodiments of the present disclosure.

FIG. 7 is a flowchart illustrating an exemplary process 700 for monitoring stop sign violation according to some embodiments of the present disclosure. In some embodiments, the process 700 may be implemented in the monitoring system 100 illustrated in FIG. 1. For example, the process 700 may be stored in a storage medium (e.g., the storage device 140, or the storage 220 of the computing device 200) as a form of instructions, and invoked and/or executed by a processor (e.g., the processing engine 112 of the server 110, the processor 220 of the computing device 200, or one or more modules in the processing engine 112 illustrated in FIG. 4). The operations of the illustrated process 700 presented below are intended to be illustrative. In some embodiments, the process 700 may be accomplished with one or more additional operations not described, and/or without one or more of the operations discussed. Additionally, the order in which the operations of the process 500 as illustrated in FIG. 7 and described below is not intended to be limiting.

In 702, the processing engine 112 may obtain a stop sign associated rule corresponding to a stop sign. The stop sign associated rule may require the vehicle to be fully stopped around the stop sign for more than a stop time threshold $T_0$. In some embodiments, the processing engine 112 may obtain a real stop time $T_1$ (also referred to as stop time $T_1$ or stop time in the present disclosure) of a vehicle and compare the real stop time $T_1$ of the vehicle with the stop time threshold $T_0$ to determine whether the vehicle violates the stop sign associated rule. In some embodiments, the processing engine 112 may obtain the stop sign associated rule from the storage device 140 via the network 120.

In 704, the camera 150 may acquire video data associated with a scene around the stop sign. The video data may include a series of frames. Details regarding the acquisition of the series of frames may be found in the descriptions associated with operation 504 in FIG. 5.

In 706, the processing engine 112 may identify a vehicle in the series of frames. In some embodiments, the processing engine 112 may identify the vehicle using an object identification model. Details regarding the identification of the vehicle in the series of frames may be found in the descriptions associated with operation 506 in FIG. 5.

In 708, the processing engine 112 may compare, based on the series of frames, locations of the vehicle at different time points. For example, the processing engine 112 may compare the location of the vehicle in a current frame with the location of the vehicle in a previous frame. Exemplary location changes of the vehicle corresponding to different time points may be found in FIG. 10. As used herein, the location change may be estimated based on the location change of a central point of the vehicle in the series of frames. Other methods of estimating the location change of the vehicle based on the series of frames may also be implemented, which are not limited by the present disclosure. For example, when the vehicle gets closer to the camera 150, the vehicle may appear larger in the series of images. The change in the size of the vehicle in the series of frames may be used to estimate the location change of the vehicle in the series of frames.

In 710, the processing engine 112 may determine a stop time $T_1$ of the vehicle based on the comparison between the locations of the vehicle at different time points. In some embodiments, the processing engine 112 may determine a first time point when the locations of the vehicle start to be unchanged (i.e., when the vehicle fully stops) and a second time point when the locations of the vehicle start to change (i.e., when the vehicle starts to move). A difference between the first time point and the second time point may be designated as the stop time of the vehicle. Detailed method and calculations regarding obtaining the stop time $T_1$ may be found in FIG. 10 and the descriptions thereof.

In 712, the processing engine 112 may obtain a stop time threshold $T_0$ corresponding to the stop sign associated rule. The stop time threshold $T_0$ may be defined by the stop sign associated rule. In some embodiments, the stop time threshold $T_0$ may vary in different countries, states/provinces, cities, districts, blocks, or the like. In some embodiments, the stop time threshold $T_0$ may depend on time and traffic flow. For instance, during traffic peak hours, the stop time threshold $T_0$ may be set as 3 s for safety reasons. During off-peak hours, the stop time threshold $T_0$ may be set as 2 s. In some embodiments, the processing engine 112 may obtain a stop time threshold $T_0$ from the storage device 140 via the network 120.

In 714, the processing engine 112 may determine whether $T_1$ is less than $T_0$. In response to a determination that $T_1$ is less than $T_0$, the processing engine 112 may proceed to 716 and determine that the vehicle violates the stop sign associated rule. The processing engine 112 may obtain information of the vehicle and transmit the information of the vehicle to the server 110 as described in connection with operation 510 and 512 in FIG. 5. In response to a determination that $T_1$ is not less than $T_0$ (i.e., $T_1$ is greater than or equal to $T_0$), the processing engine 112 may proceed to 718 and determine that the vehicle does not violate the stop sign associated rule.

Figure 8:
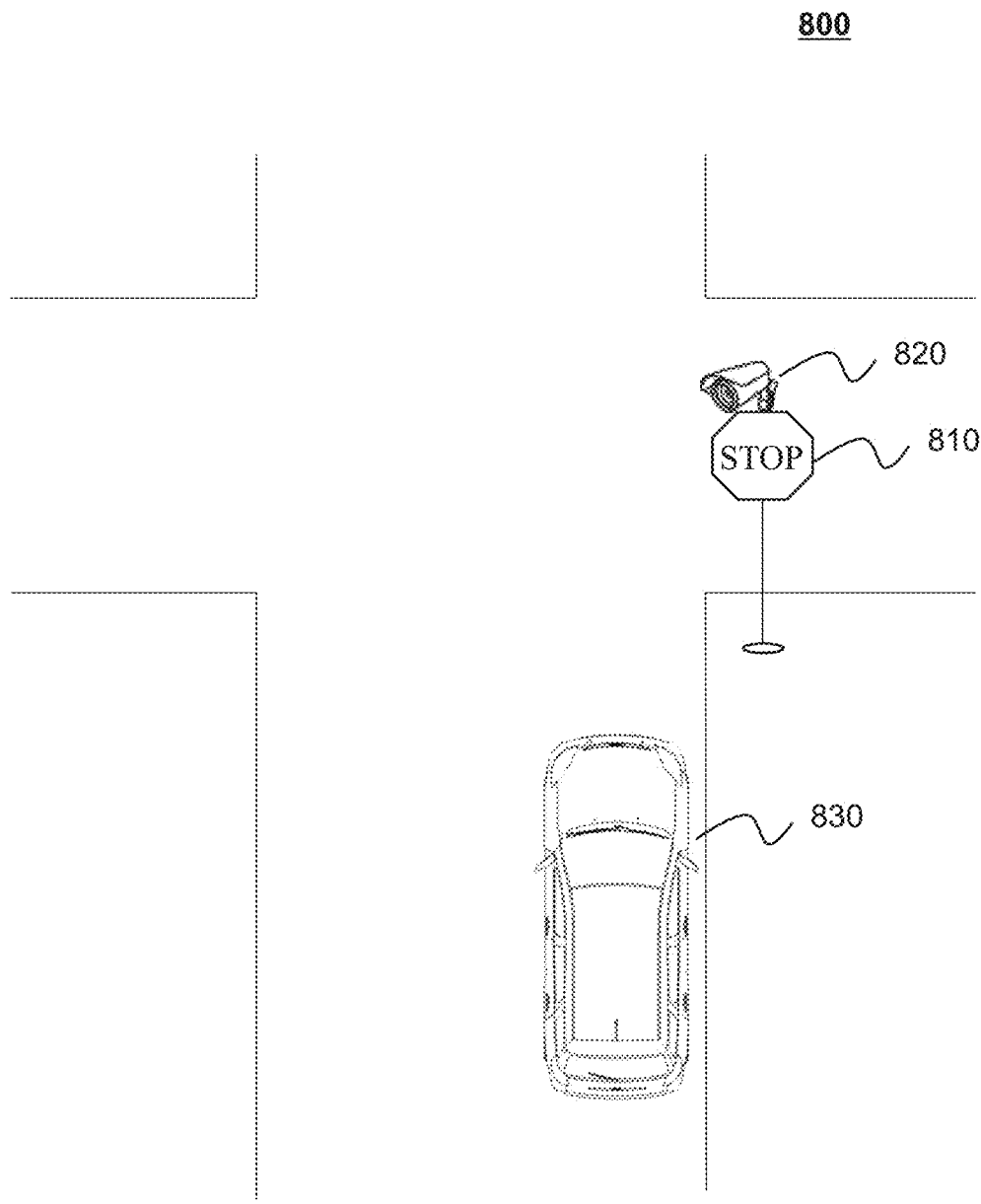
FIG. 8 is a schematic diagram for monitoring stop sign violation according to some embodiments of the present disclosure.

FIG. 8 is a schematic diagram for monitoring stop sign violation according to some embodiments of the present disclosure. As illustrated in FIG. 8, a stop sign 810 is configured at an intersection. In some embodiments, the stop sign 810 may include a one-way stop sign, a two-way stop sign or a four-way stop sign, etc. It should be noted that FIG. 8 is merely for illustration purposes. For example, there may be a plurality of stop signs (e.g., 2, 4, 8) at the intersection.

A camera 820 is mounted on the stop sign 810. The camera 820 may be configured to acquire video data associated with a scene around the traffic sign 810. The video data may include a series of frames captured at different time points. A stop sign associated rule may require the vehicle 830 to be fully stopped around the stop sign 810 for more than a stop time threshold. The processing engine 112 may determine whether the vehicle 830 violates the stop sign associated rule based on the series of frames as described elsewhere in the present disclosure (for example, FIG. 7 and the descriptions thereof).

It should be noted that the examples illustrated in FIG. 8 and the above descriptions thereof are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the camera 820 may also be mounted on a traffic light, a street lamp, a utility pole, a tree, a building, a vehicle stopped near the traffic sign, or the like, or any combination thereof.

Figure 9A:
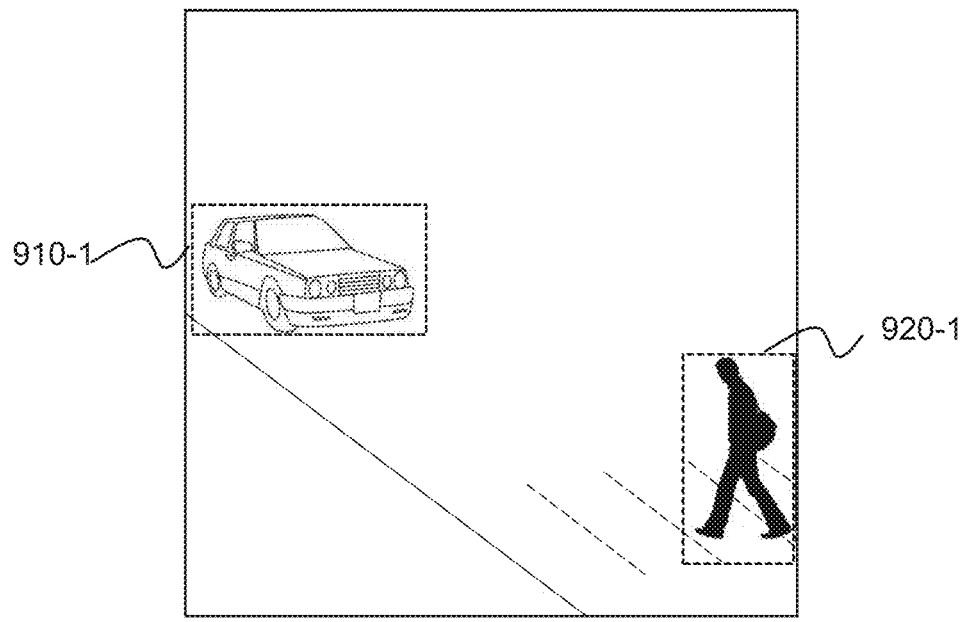
FIGS. 9A-9C are schematic diagrams illustrating exemplary frames associated with a scene around a traffic sign according to some embodiments of the present disclosure.
Figure 9B:
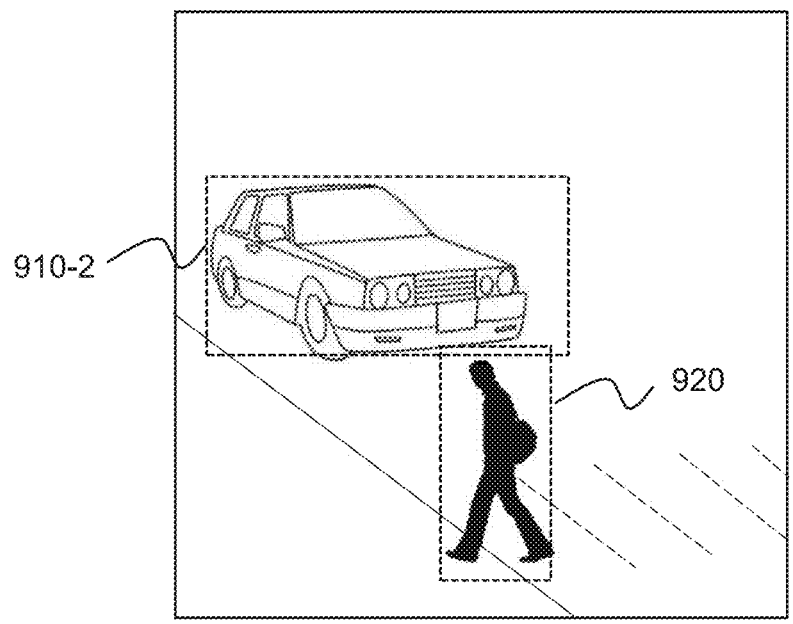
Figure 9C:
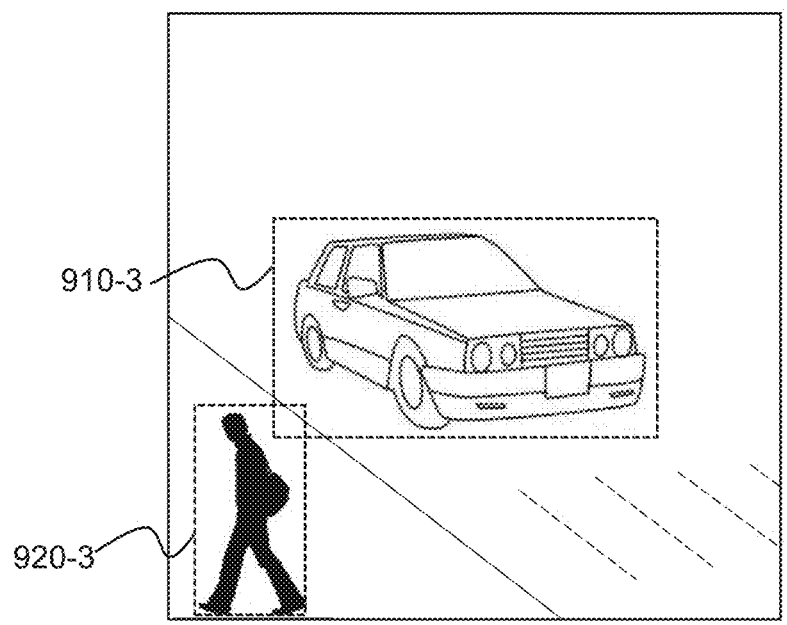

FIGS. 9A-9C are schematic diagrams illustrating exemplary frames associated with a scene around a traffic sign according to some embodiments of the present disclosure. In some embodiments, the processing engine 112 may identify a vehicle in the series of frames and correlate the identified vehicle. For example, an object 910-1 in FIG. 9A, an object 910-2 in FIG. 9B, and an object 910-3 in FIG. 9C may be identified as a vehicle, respectively. The processing engine 112 may determine a similarity degree between the objects 910-1, 910-2 and 910-3. The similarity degrees among the objects 910-1, 910-2 and 910-3 may be greater than a preset threshold. The objects 910-1, 910-2 and 910-3 may be correlated to the same vehicle. The processing engine 112 may determine whether the identified vehicle violates the traffic rule corresponding to the traffic sign based on the series of frames as described elsewhere in the present disclosure (for example, FIG. 5 and the descriptions thereof). In some embodiments, the object 920-1 in FIG. 9A, the object 920-2 in FIG. 9B, and the object 920-3 in FIG. 9C may be determined not to be the same vehicle and may not be correlated. The processing engine 112 may not conduct any further processing (e.g., judgment on the violation of the traffic rule) on the objects 920-1, 920-2 and 920-3.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, there may be a plurality of vehicles identified in the series of images. The processing engine 112 may determine whether each of the plurality of vehicles violates the traffic rule.

FIG. 10 is a schematic diagram of location changes of a vehicle corresponding to different time points according to some embodiments of the present disclosure. As illustrated in FIG. 10, the location change along the driving direction of the vehicle at $t_2$, $t_3$, $t_4$ (i.e., location change from $t_1$ to $t_2$, location change from $t_2$ to $t_3$, location change from $t_3$ to $t_4$) is 2 cm, 1 cm, 0 cm, respectively, which may indicate a deceleration (or braking) process of the vehicle from $t_1$ to $t_3$. The location of the vehicle at $t_4$ is the same as the location of the vehicle at $t_3$. In other words, the location of the vehicle starts to be unchanged (i.e., the vehicle stops) at $t_3$ (i.e., the first time point). The location change remains to be 0 cm from $t_4$ to $t_7$, which indicates that the vehicle is fully stopped from $t_3$ to $t_6$. At $t_8$ and $t_9$, the location change increases, which may indicate that the vehicle starts to move at $t_7$ (i.e., the second time point) and may accelerate from $t_7$ to $t_9$. The time period from $t_3$ to $t_7$ may be determined as the stop time $T_1$.

It should be noted that the time points and location changes illustrated in FIG. 10 are merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing engine 112 may estimate the location change of the vehicle based on a change in the size of the vehicle in the series of images. As another example, the processing engine 112 may estimate the speed of the vehicle at different time points based on the series of images.

FIG. 11 is a schematic diagram of exemplary traffic sign violation records according to some embodiments of the present disclosure. As shown in FIG. 11, a violation record may include a record number, a violation type, a plate number, a time when the vehicle violates the traffic rule, a location where the vehicle violates the traffic rule, or the like, or any combination thereof. In some embodiments, the violation records shown in FIG. 11 may be associated with video data acquired by different cameras 150 located on or near different traffic signs. In some embodiments, the violation records may be associated with video data acquired by a same camera 150 at different locations and at different time. The camera 150 may be mounted on an object, such as a vehicle, an unmanned aerial vehicle (UAV), etc. The location of the camera 150 may be adjusted by moving the object on which the camera 150 is mounted.

Merely by way of example, the violation record 18000001 may be associated with a stop sign violation record. The plate number of the vehicle that violates the stop sign associated rule may be 1ABC234. In some embodiments, the violation record 18000001 may further include an actual stop time related to the vehicle that violates the stop sign associated rule. The actual stop time may be determined by the monitoring system 100. The processing engine 112 or a user may compare the actual stop time with the stop time threshold $T_0$. The penalty decision associated with the violation record 18000001 may be based on a difference between the actual stop time and the stop time threshold $T_0$. As another example, the violation record 18000002 may be associated with a traffic rule corresponding to a no parking sign. The plate number of the vehicle that violates the traffic rule associated with the no parking sign may be 2DEF567. In some embodiments, the violation record 18000002 may further include an actual parking time. The penalty decision associated with the violation record 18000002 may be based on the actual parking time. As yet another example, the violation record 18000003 may be associated with a traffic rule corresponding to a speed limit sign. The plate number of the vehicle that violates the traffic rule associated with the speed limit sign may be 3GHI890. In some embodiments, the violation record 18000003 may further include an actual speed of the vehicle that violates the traffic rule associated with the speed limit sign. The penalty decision associated with the violation record 18000002 may be based on the actual speed of the vehicle.

It should be noted that the table and the information shown in FIG. 11 are only for illustration. The information of the vehicle may be sent to the server 110 in other forms, such as a diagram, a database, or the like, or any combination thereof. Other information associated with the vehicle that violates the traffic rule may also be sent to the server 110, for example, the name and/or identity number of the driver responsible for the violation, the evidence for the violation, a penalty decision, or the like, or any combination thereof. In some embodiments, at least one of the series of frames may be transmitted to the server 110 and/or stored in the storage device 140 as evidence of the violation associated with the vehicle. In some embodiments, the processing engine 112 may determine, based on the violation record, a penalty decision for the driver responsible for the violation according to the associated traffic rule.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for determining a traffic sign violation, comprising:
    at least one camera configured to acquire video data associated with a scene around a traffic sign, wherein the video data includes a series of frames;
    at least one storage medium storing a set of instructions; and
    at least one processor configured to communicate with the at least storage medium, wherein when executing the set of instructions, the at least one processor is directed to cause the system to:
        obtain a traffic rule corresponding to the traffic sign, wherein the traffic sign is a stop sign and the traffic rule is a stop sign associated rule including a stop time threshold;
        identify a vehicle in the series of frames, wherein uninterested regions presented in the series of frames are removed, the uninterested regions including one or more lanes on which the motion of vehicle is not limited by a traffic rule;
        compare, based on the series of frames, locations of the vehicle at different time points;
        determine a stop time of the vehicle based on the comparison between the locations of the vehicle at different time points;
        in response to the determination that the stop time of the vehicle is less than the stop time threshold, determine that the vehicle violates the stop sign associated rule; and
        in response to the determination that the vehicle violates the traffic rule,
        obtain information of the vehicle; and
        transmit the information of the vehicle to a server.

2. The system of claim 1, wherein to identify the vehicle in the series of frames, the at least one processor is further directed to cause the system to:
    obtain an object identification model;
    execute the object identification model to identify the vehicle in each of the series of frames; and
    correlate the identified vehicle in each of the series of frames.

3. The system of claim 2, wherein the object identification model is a you only look once model, a Haar-boosting model, a Faster R-CNN model, or a Mask R-CNN model.

4. The system of claim 1, wherein the stop time of the vehicle is a time period when a velocity of the vehicle is zero.

5. The system of claim 4, wherein to determine the stop time of the vehicle based on the comparison between the locations of the vehicle at different time points, the at least one processor is further directed to cause the system to:
    determine a first time point when the locations of the vehicle start to be unchanged;
    determine a second time point when the locations of the vehicle start to change; and
    determine a difference between the first time point and the second time point as the stop time of the vehicle.

6. The system of claim 1, wherein to obtain the information of the vehicle, the at least one processor is further directed to cause the system to:
    identify a plate number of the vehicle.

7. The system of claim 6, wherein to identify the plate number of the vehicle, the at least one processor is further directed to cause the system to:
    locate a plate region in at least one of the series of frames; and
    identify the plate number in the plate region.

8. The system of claim 1, wherein in response to the determination that the vehicle violates the traffic rule, the at least one processor is further directed to cause the system to:
    transmit a traffic violation notification to a user terminal that is associated with the vehicle violating the traffic rule.

9. The system of claim 1, wherein the information of the vehicle comprises at least one of a plate number of the vehicle, a location where the vehicle violates the traffic rule, at least one of the series of frames, or a time when the vehicle violates the traffic rule.

10. The system of claim 1, wherein the camera is mounted on the traffic sign.

11. The system of claim 1, wherein the camera is mounted on a vehicle near the traffic sign.

12. The system of claim 1, wherein the camera is included in a mobile terminal.

13. The system of claim 1, wherein to compare, based on the series of frames, locations of the vehicle at different time points, the at least one processor is directed to cause the system to:
    determine whether a location change of the vehicle occurs by comparing locations of a central point of the vehicle presented in the series of frames; or
    determine whether a location change of the vehicle occurs by comparing sizes of the vehicle presented in the series of frames.

14. A method implemented on a computing device having at least one storage device storing a set of instructions for determining a traffic sign violation, and at least one processor in communication with the at least one storage device, the method comprising:
    obtaining a traffic rule corresponding to a traffic sign, wherein the traffic sign is a stop sign and the traffic rule is a stop sign associated with the rule including a stop time threshold;
    acquiring, by at least one camera, video data associated with a scene around the traffic sign, wherein the video data includes a series of frames;
    identifying a vehicle in the series of frames, wherein uninterested regions presented in the series of frames are removed, the uninterested regions including one or more lanes on which motion of the vehicle is not limited by the traffic rule;

comparing, based on the series of frames, locations of the vehicle at different time points;
determining a stop time of the vehicle based on the comparison between the locations of the vehicle at the different time points;
determining whether the stop time of the vehicle is less than the stop time threshold;
in response to the determination that the stop time of the vehicle is less than the stop time threshold, determining that the vehicle violates the stop sign associated rule; and
in response to the determination that the vehicle violates the traffic rule,
obtaining information of the vehicle; and
transmitting the information of the vehicle to a server.

15. The method of claim 14, wherein the identifying the vehicle in the series of frames further comprises:
obtaining an object identification model;
executing the object identification model to identify the vehicle in each of the series of frames; and
correlating the identified vehicle in each of the series of frames.

16. The method of claim 14, wherein the determining the stop time of the vehicle based on the comparison between the locations of the vehicle at different time points comprises:
determining a first time point when the locations of the vehicle start to be unchanged;
determining a second time point when the locations of the vehicle start to change; and
determining a difference between the first time point and the second time point as the stop time of the vehicle.

17. The method of claim 14, wherein in response to the determination that the vehicle violates the traffic rule, the method further comprises transmitting a traffic violation notification to a user terminal that is associated with the vehicle violating the traffic rule.

18. A non-transitory computer readable medium comprising executable instructions that, when executed by at least one processor, cause the at least one processor to effectuate a method for determining a traffic sign violation, the method comprising:
obtaining a traffic rule corresponding to the traffic sign, wherein the traffic sign is a stop sign and the traffic rule is a stop sign associated rule including a stop time threshold;
acquiring, by at least one camera, video data associated with a scene around a traffic sign, wherein the video data includes a series of frames;
identifying a vehicle in the series of frames, wherein uninterested regions presented in the series of frames are removed, the uninterested regions including one or more lanes on which motion of the vehicle is not limited by the traffic rule;
comparing, based on the series of frames, locations of the vehicle at different time points;
determining a stop time of the vehicle based on the comparison between the locations of the vehicle at the different time points;
determining whether the stop time of the vehicle is less than the stop time threshold;
in response to the determination that the stop time of the vehicle is less than the stop time threshold, determining that the vehicle violates the stop sign associated rule; and
in response to the determination that the vehicle violates the traffic rule,
obtaining information of the vehicle; and
transmitting the information of the vehicle to a server.

* * * * *